United States Patent [19]
Segan

[11] Patent Number: 5,937,380
[45] Date of Patent: Aug. 10, 1999

[54] KEYPAD-ASSISTED SPEECH RECOGNITION FOR TEXT OR COMMAND INPUT TO CONCURRENTLY-RUNNING COMPUTER APPLICATION

[75] Inventor: Marc H. Segan, New York, N.Y.

[73] Assignee: M.H. Segan Limited Partenship, Great Barrington, Mass.

[21] Appl. No.: 09/105,662

[22] Filed: Jun. 26, 1998

Related U.S. Application Data

[60] Provisional application No. 60/050,998, Jun. 27, 1997.

[51] Int. Cl.$^6$ .................................................. G10L 9/06
[52] U.S. Cl. ........................................ 704/235; 704/275
[58] Field of Search .................................. 704/235, 252, 704/254, 275

[56] References Cited

U.S. PATENT DOCUMENTS

| | | | |
|---|---|---|---|
| 4,866,778 | 9/1989 | Baker | 704/254 |
| 5,022,081 | 6/1991 | Hirose et al. | 704/235 |
| 5,027,406 | 6/1991 | Roberts et al. | 704/244 |
| 5,058,167 | 10/1991 | Kimura | 704/249 |
| 5,144,672 | 9/1992 | Kuriki | 704/252 |
| 5,329,609 | 7/1994 | Sanada et al. | 704/251 |
| 5,500,919 | 3/1996 | Luther | 704/260 |
| 5,546,499 | 8/1996 | Lynch et al. | 704/240 |
| 5,799,267 | 8/1998 | Siegel | 704/1 |

*Primary Examiner*—David R. Hudspeth
*Assistant Examiner*—Tālivaldis Ivars Šmits
*Attorney, Agent, or Firm*—Cohen, Pontani, Lieberman & Pavane

[57] ABSTRACT

A method for recognizing a spoken audio signal as input data to a computer includes receiving the spoken audio signal at an input device of the computer, receiving a typed first letter of the spoken audio signal at the input device of the computer and searching through entries that begin with the typed first letter in a dictionary in the computer for a best match with the spoken audio signal.

4 Claims, 3 Drawing Sheets

KEYPAD-ASSISTED SPEECH RECOGNITION FOR TEXT OR COMMAND INPUT TO CONCURRENTLY-RUNNING COMPUTER APPLICATION

RELATED APPLICATIONS

This application claims priority from provisional application No. 60/050,998, filed Jun. 27, 1997. The disclosure of this provisional application is expressly incorporated herein by reference.

BACKGROUND OF THE INVENTION

I. Field of the Invention

The present invention relates to a computer interface method and device wherein a user's voice is used to input data to a computer. More particularly, the present invention pertains to a method and apparatus wherein a user's voice, in conjunction with a keyboard, is used for inputting instructions or data to a computer. Most particularly, the present invention relates to a speech recognition computer input method and apparatus wherein a user inputs data into a computer by speaking each word while typing, via a keyboard, the first letter of each spoken word to assist the computer in identifying or recognizing the spoken words.

II. Description of the Related Art

There currently exists various inexpensive software programs for use with personal computers that allow voice input of text and instructions. Some such programs are offered by Dragon Systems, IBM and Kurzweil. These programs allow a user's speech to be input to a computer via, for example, an audio input device, whereupon the spoken words are identified and used for various applications such as for text input or to execute commands. As can be appreciated, such man-machine dictation programs save users time by alleviating the need to enter data via a keyboard to generate documents.

With reference to FIG. 1, a diagram of the steps used in a prior art program for effectuating speech input to a computer is depicted. As shown, the prior art program is divided into five separate steps. The first step involves the user speaking in proximity to a computer so that a sound detector can receive the spoken audio signal. The computer then determines when each word begins. For each spoken word, a dictionary search is conducted to locate potential matches between stored dictionary words and each spoken word. The best dictionary word match is then selected from the potential matches and the selected word is forwarded to an application.

Unfortunately, such prior art programs suffer several drawbacks. Specifically, the error rate for such programs remains high. Moreover, problems exist with continuous speech input, thus requiring an awkward style of spoken input by pausing at intervals to allow the program to identify the spoken words and process the information. Also, such prior art programs must be trained prior to use. In other words, prior to use a user must take time to record a large sample vocabulary for the machine to compare with inputs.

As a result of the drawbacks of prior art programs, users are left with the situation of continuing to rely upon old methods for accurate, convenient text input, which involve either someone to take dictation and then enter the spoken words into a computer via a keyboard, or fast typing skills. Moreover, the continuous and frequent use of a keyboard results in a risk of repetitive stress injuries and fatigue.

DETAILED DESCRIPTION OF THE PRESENTLY PREFERRED EMBODIMENTS

The present invention utilizes known speech recognition technology to allow a user to type the initial letter of each spoken word, via a keyboard, substantially simultaneously with the spoken word, thereby reducing the processing power and time required by a computer. The invention overcomes the drawbacks of the prior art in several respects. Initially, continuous speech becomes possible because the computer is advised exactly when a new word begins—by keyboard entry of the first letter of each word—thus, vastly reducing processing power which was required in prior art systems to determine when one word ended and another began. In addition, the possible choice of words is vastly reduced for the computer since the initial letter is known via keyboard input. This feature further reduces the required processing power and time because fewer words from the dictionary need to be located and retrieved. This feature also increases the accuracy of the selected or retrieved word because the first letter of the spoken word is provided to the computer.

In addition to the foregoing benefits, the present invention requires significantly less typing than standard keyboard entry. As a result, smaller keyboards relative to standard sized keyboards may be used, thereby increasing user workstation surface area that was previously occupied by a standard size keyboard. Moreover, the present invention is particularly well-suited for use with palm-sized computers or Personal Digital Assistants (PDA's). Furthermore, as less typing is required for data input, there is a reduced chance that injury, fatigue and error will occur.

As a result of the present invention, speaker independent programs can become feasible much more easily since the reliance on the computer's ability to discriminate variations in pronunciation is considerably diminished.

Figure 1:
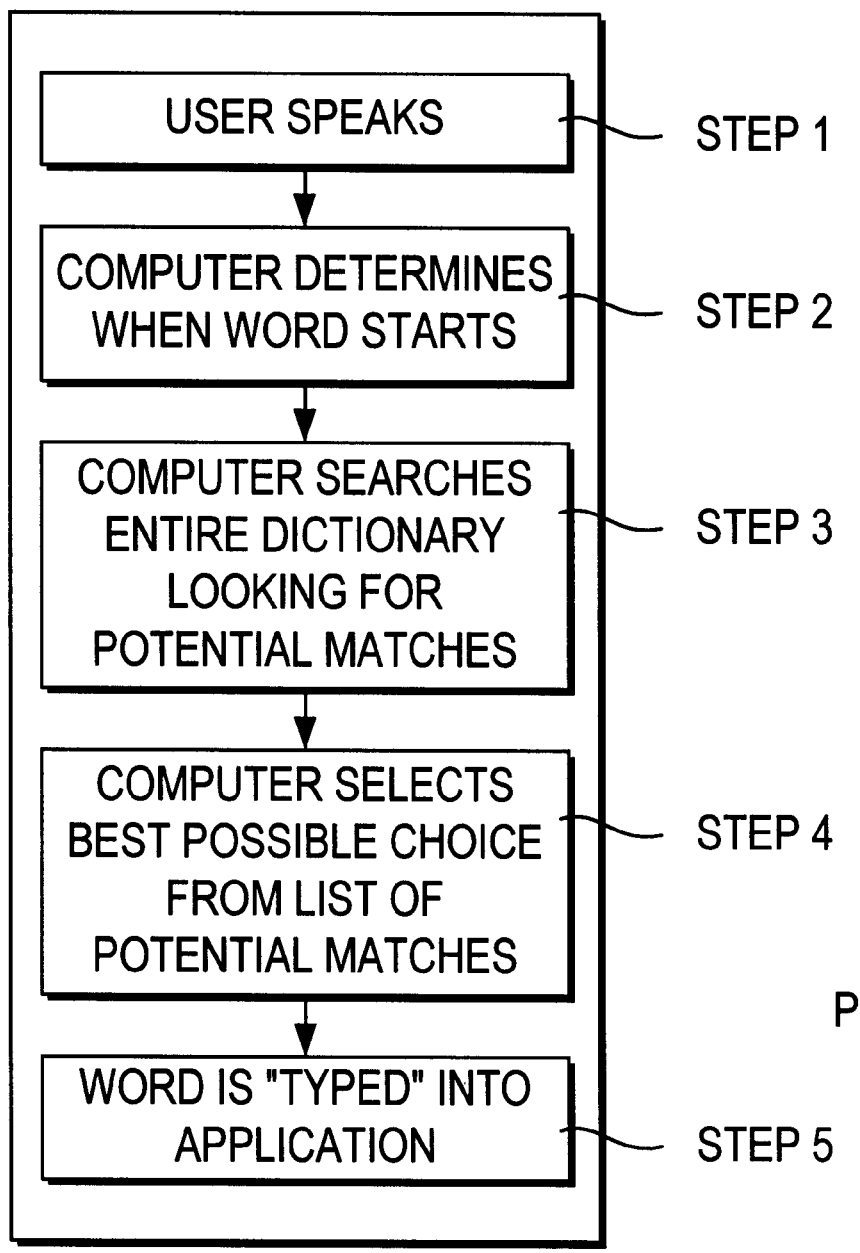
FIG. 1 is a block diagram depicting the steps of a prior art voice input method.
Figure 2:
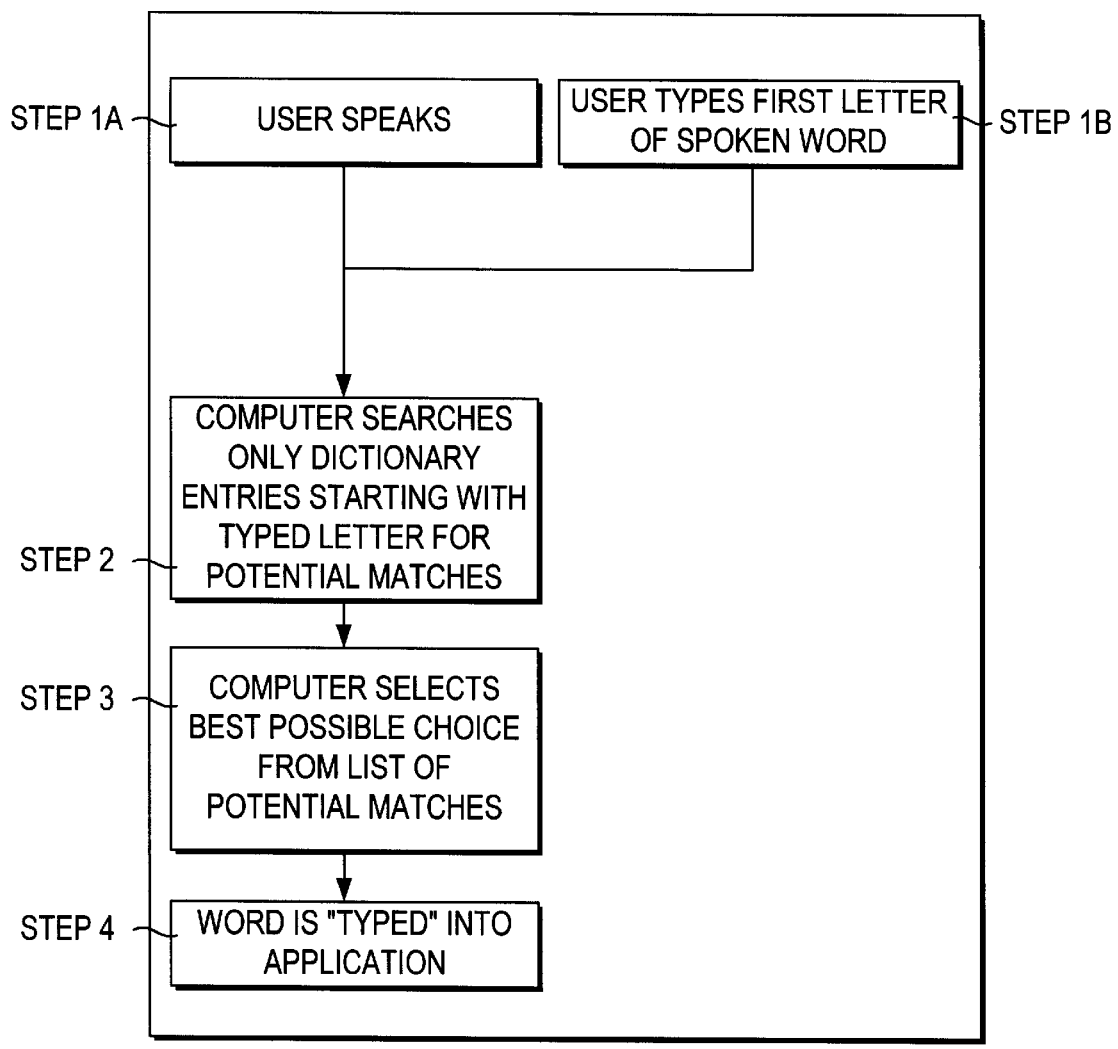
FIG. 2 is a block diagram depicting the steps of an embodiment of the speech recognition computer input method and device in accordance with the present invention.

The present invention is depicted in FIG. 2. As shown, steps 1A and 1B are performed substantially simultaneously with each other. In the alternative, a buffer register may be employed to temporarily store either the spoken word or the typed letter while awaiting input of the other of the corresponding spoken word or input letter. Once both a spoken word and a letter are input to the computer, a search is conducted among dictionary entries, starting with the typed letter, to locate potential matches. The best match is then selected and the selected word is forwarded to an application.

Figure 3:
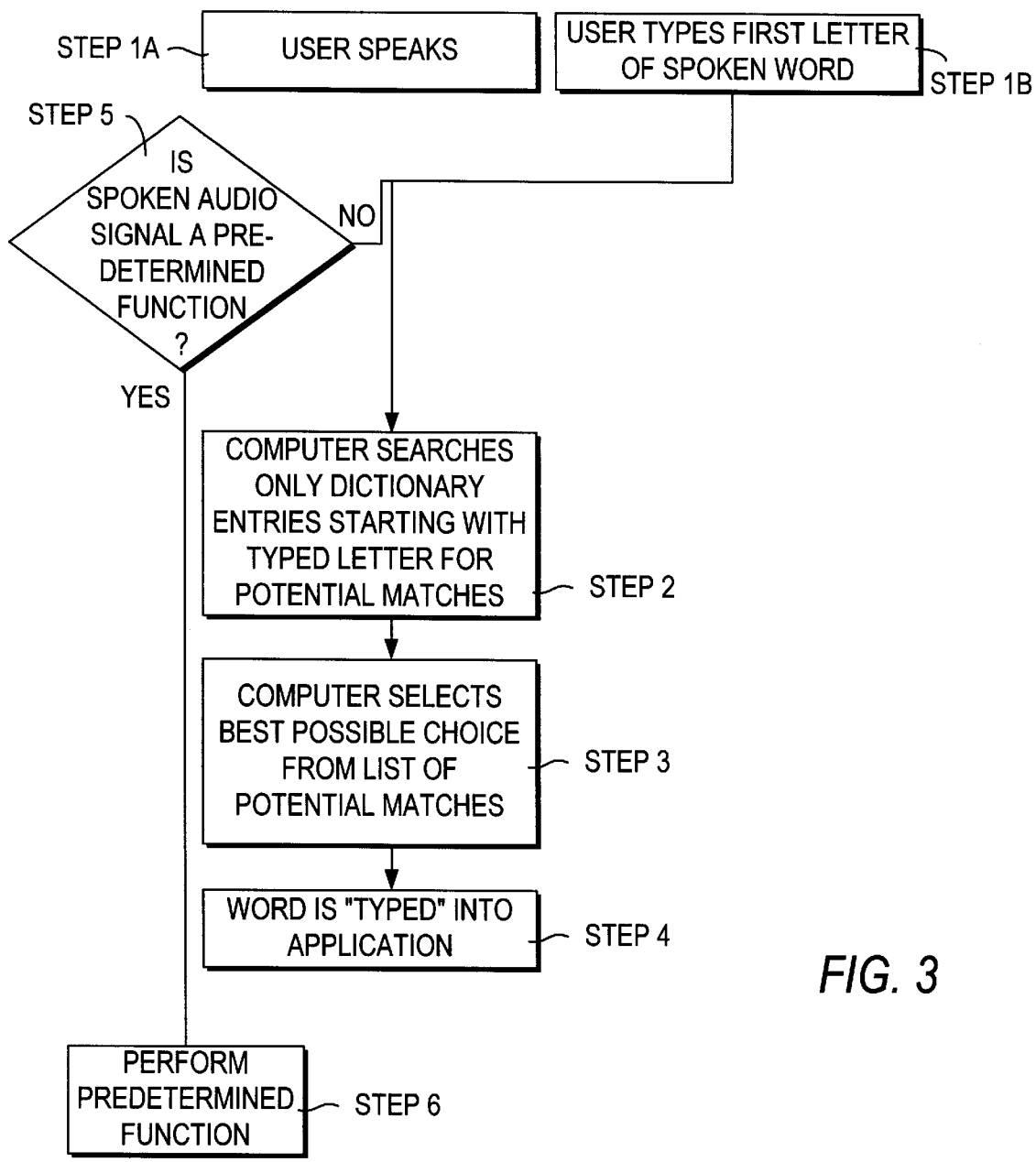
FIG. 3 is a block diagram depicting the steps of another embodiment of the speech recognition computer input method and device in accordance with the present invention.

In addition to the above, FIG. 3 shows that the present invention may assign or designate single or multiple words to specific functions which are performed when the designated word is spoken without the first letter of the word being typed as in steps 5 and 6 of FIG. 3. As an illustration, the word "delete" may be assigned the function of erasing the last typed word when the word "delete" is spoken without typing the letter "d". Thus, if the computer incorrectly identifies a word based on the spoken word and typed in first letter of the spoken word, a user can strike or erase the incorrect word by saying the word "delete". Of course, if the word "delete" is intended to be input, the word will be spoken and the letter "d" will be pressed on the keyboard. Such a function can be performed on any incorrect word by simply moving the cursor to the incorrect word and saying "delete". Step 5 comprises the step of comparing the spoken audio signal to a list of predetermined functions. Step 5 may optionally comprise the steps of determining whether the user types a first letter and then comparing the spoken audio signal to the list of predetermined functions.

The invention is not limited by the embodiments described above which are presented as examples only but can be modified in various ways as will be readily recognized by those having ordinary skill in the art. For example, instead of typing only the first letter of each spoken word, the first and last letters can be typed, or, alternatively, the first two letters can be typed, thereby further reducing computer processing power and time.

I claim:

1. A method for facilitating the identification of spoken words by a speech recognition computer application which accesses a storage device containing dictionary entries and which inputs identified words into a concurrently running computer application, the method comprising the steps of:

a. receiving an audio signal representing a word spoken by a user;

b. receiving a user keyed entry through a user-manipulable key pad representing at least the initial letter of the spoken word;

c. after steps a. and b., automatically selecting a match between said spoken word and said dictionary entries by comparing said audio signal only with those dictionary entries containing said at least the initial letter; and e. then inserting said match into the concurrently running computer application, without requiring further user input.

2. The method of claim 1, wherein said steps a. and b. are performed substantially simultaneously.

3. The method of claim 1, wherein one of said steps a. and b. is performed before the other of said steps a. and b., and said computer interface method further comprises the step of storing said one of said steps a. and b. in a buffer register until the other of said steps a. and b. is performed.

4. The method of claim 1, further comprising the steps of:

f. determining whether the spoken audio signal comprises a predetermined function;

g. performing the predetermined function if it is determined in step f. that the spoken audio signal comprises the predetermined function; and h. performing step c. if the spoken audio interface is not the predetermined function.

* * * * *